(No Model.) 9 Sheets—Sheet 1.

J. BAKER.
ICE CREAM FREEZER.

No. 459,539. Patented Sept. 15, 1891.

Witnesses,
G. Y. Thorpe
Jno. L. Condron

Inventor,
Jay Baker,
Higdon & Higdon,
Attorneys.

(No Model.) 9 Sheets—Sheet 2.
J. BAKER.
ICE CREAM FREEZER.

No. 459,539. Patented Sept. 15, 1891.

Witnesses:
G. W. Thoope,
Jno. L. Condron.

Inventor,
Jay Baker,
Bigdon & Bigdon,
Attorneys (No Model.) 9 Sheets—Sheet 3.

J. BAKER.
ICE CREAM FREEZER.

No. 459,539. Patented Sept. 15, 1891.

Witnesses:

Inventor:
Jay Baker.

Fig. 5.

(No Model.) 9 Sheets—Sheet 5.
J. BAKER.
ICE CREAM FREEZER.

No. 459,539. Patented Sept. 15, 1891.

(No Model.) 9 Sheets—Sheet 6.

J. BAKER.
ICE CREAM FREEZER.

No. 459,539. Patented Sept. 15, 1891.

Witnesses:
Geo. J. Shoppe
Jno. L. Condron Inventor,
Jay Baker,
Rigdon & Rigdon
Attorneys.

(No Model.) 9 Sheets—Sheet 7.

J. BAKER.
ICE CREAM FREEZER.

No. 459,539. Patented Sept. 15, 1891.

Witnesses:

Inventor
Jay Baker.
Higdon & Higdon
Attorneys.

(No Model.) 9 Sheets—Sheet 8.
J. BAKER.
ICE CREAM FREEZER.

No. 459,539. Patented Sept. 15, 1891.

Witnesses,
Inventor,
Jay Baker.
Higdon & Higdon,
Attorneys.

(No Model.) 9 Sheets—Sheet 9.

J. BAKER.
ICE CREAM FREEZER.

No. 459,539. Patented Sept. 15, 1891.

UNITED STATES PATENT OFFICE.

JAY BAKER, OF KANSAS CITY, MISSOURI.

ICE-CREAM FREEZER.

SPECIFICATION forming part of Letters Patent No. 459,539, dated September 15, 1891.

Application filed June 22, 1891. Serial No. 397,111. (No model.)

*To all whom it may concern:*

Be it known that I, JAY BAKER, of Kansas City, Jackson county, Missouri, have invented certain new and useful Improvements in Apparatus for Manufacturing Ice-Cream, &c., of which the following is a full, clear, and exact description, reference being had to the accompanying drawings, forming a part hereof.

My invention relates to the manufacture of ice-cream, water-ices, frozen custards, and similar preparations; and the objects of my invention are to provide an apparatus for producing ice-cream, water-ices, frozen custards, &c., which shall be simple, durable, and comparatively inexpensive in construction, and by means of which the liquid preparation to be transformed into a frozen state shall be treated by contact with the external surface of a movable receptacle of any suitable form and charged internally with cold-producing substances, and thus be rapidly and uniformly transformed into a properly frozen condition without "grain" or granulation.

A still further object of my invention is to produce an apparatus which shall be capable of producing simultaneously different kinds of frozen preparations, or the same kind of frozen preparation differently flavored, and by means of which the palatableness of the preparation shall be thoroughly developed.

To the above purposes my invention consists in certain peculiar and novel features of construction and arrangement, as hereinafter described and claimed.

In order that my invention may be fully understood, I will proceed to describe it with reference to the accompanying drawings, in which—

Figure 1:
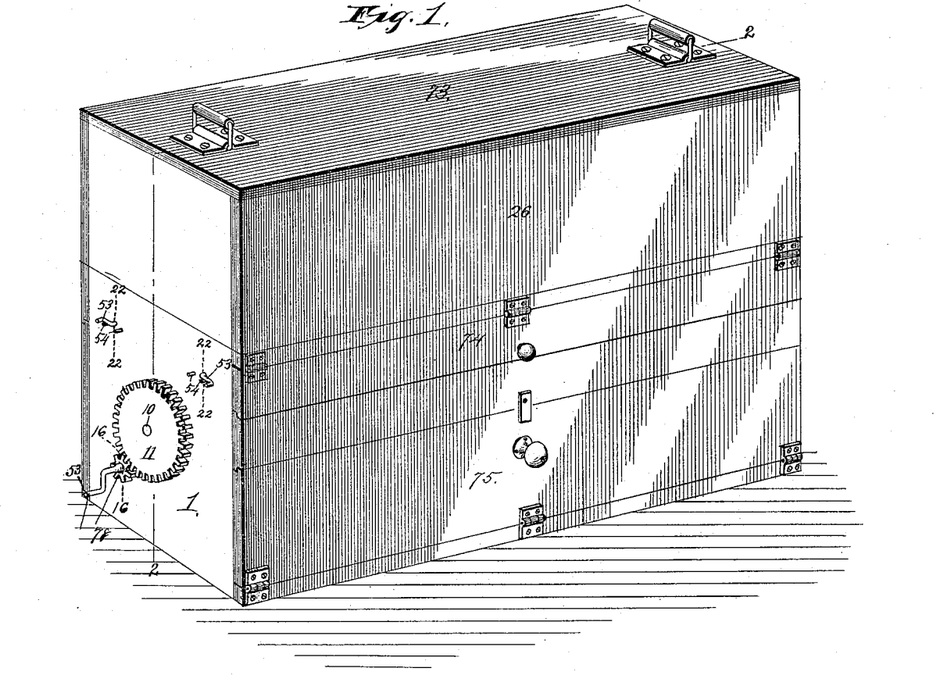
Figure 1 is a perspective view of an apparatus for manufacturing ice-cream, &c., embodying my invention.
Figures 7, 23:
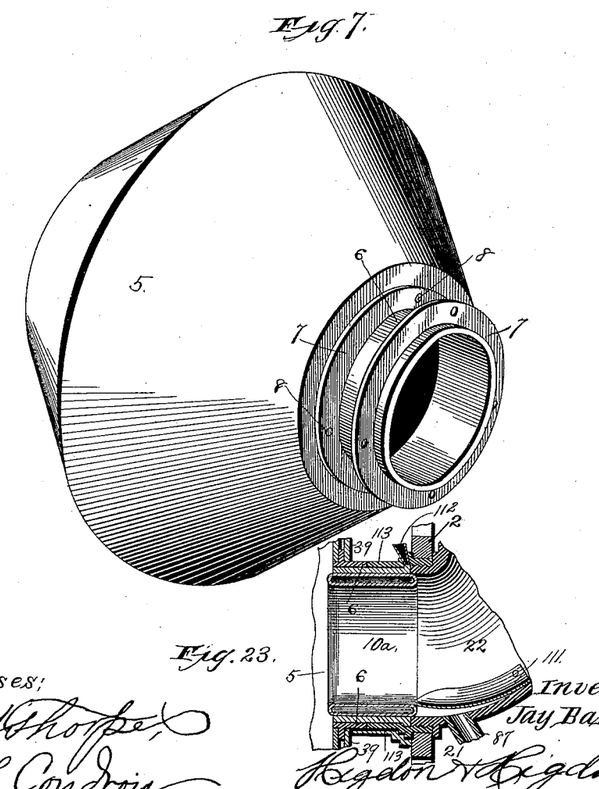
Fig. 7 is a detached perspective view of one of the receptacles for receiving the cold-producing substance and for freezing the preparation delivered by the receptacle shown in Fig. 6.
Fig. 23 is a longitudinal sectional view, on an enlarged scale, of the bend and adjacent hub of the freezing-receptacle, showing the cold-resisting ring and the lubricator for the bearing.

Referring first more particularly to Figs. 1, 2, 3, 4, 5, 20, and 21, 1 designates a casing or housing within which the operative parts of my apparatus are inclosed. In Fig. 1 this casing or housing is shown as of oblong rectangular form and as constructed of wood. It is to be distinctly understood, however, that the casing or housing may be of any suitable or preferred form, as well as of any suitable or preferred material, such as cast-iron, marble, or other metal as well as of wood, the purpose of the casing being to properly surround and inclose the operative parts of the apparatus, and at the same time to retain the cold entirely within the casing, so as to insure its most economical application. Within this casing at either end of the same is located a vertical standard or supporting-frame 2, which is of open or skeleton form and preferably of metal, the said standards or supporting-frames being connected and braced together by any suitable or preferred number of tie-rods 3, (five of such rods being shown.) These tie-rods extend horizontally and longitudinally of the casing 1, and their ends are securely connected to the standards 1 by nuts 4. Within the lower part of this casing are located a number of hollow revoluble freezing-receptacles 5, (see also Fig. 7,) each of which is shown as of double frusto-conical form, the bases of the two frustrated cones meeting each other in the middle of the receptacle, so that in longitudinal section the receptacle is of V form, as shown. In Figs. 2, 3, 4, 20, and 21 five of these freezing-receptacles are shown; but it is to be understood that this number may be increased or diminished at pleasure without departing from the essential spirit of my invention. Each of these freezing-receptacles is constructed of block-tin, cast-iron, sheet-iron, or any other suitable or preferred metal which will readily part with and absorb heat, and the adjacent ends of each two receptacles are connected by a tubular coupling 6, the ends of which enter the openings in the ends of the receptacles. Near each end each of these tubular couplings is provided with an external annular flange 7, through each of which are passed a number of bolts or rivets 8, which enter the truncated end of the corresponding receptacle 5, and thus the several receptacles are secured in horizontal series, as shown. The receptacle 5 at one end of the series is formed at that side which is adjacent to the corresponding standard 2 with an offset 9, from the outer side of which extends a stud-axle 10, having bearing in the standard 2 and projecting through the corresponding end of the casing, the outer end of said stud-axle 10 carrying a gear-wheel 11 for revolving the series of freezing-receptacles, as hereinafter fully described.

12 (see also Fig. 14) designates a number of vertical standards or supports, each of which is of oblong rectangular form and provided at its lower end with two oppositely-extending flanges 13, by means of which the standards are bolted or otherwise secured in proper position upon the bottom of the casing 1. At its upper part each of these supports is formed with a pair of oppositely-disposed horizontal flanges or ribs 14, for a purpose to be presently explained.

Figure 2:
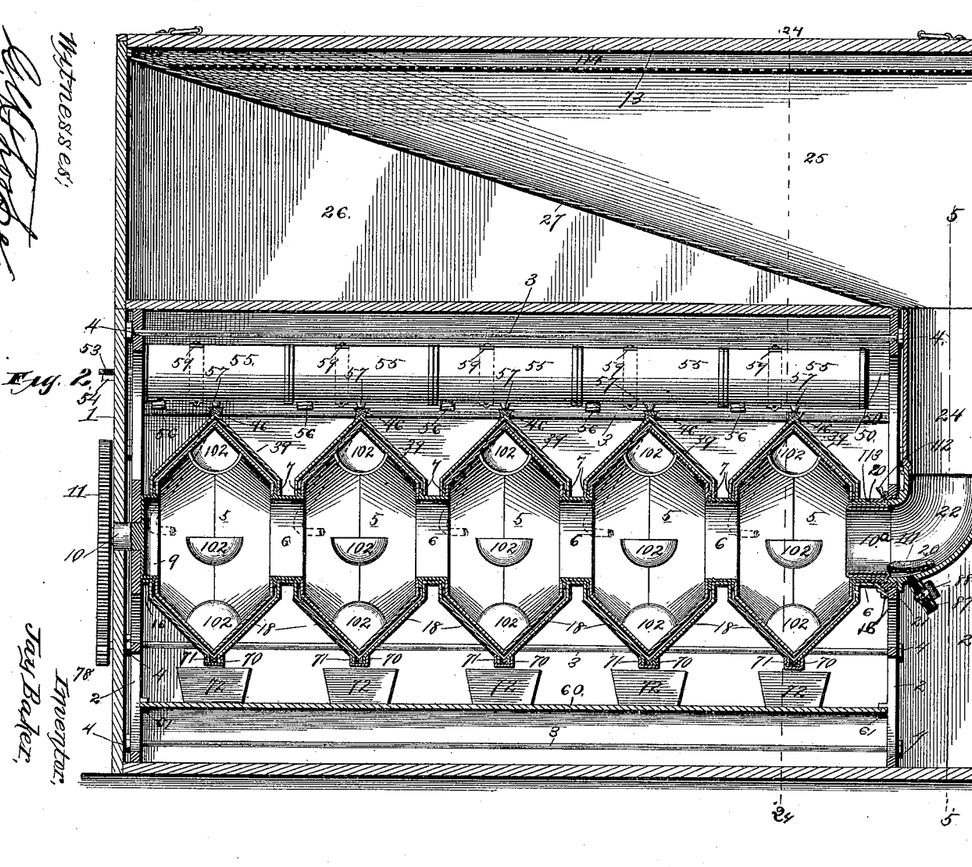
Fig. 2 is a vertical longitudinal section of the same on the line 2 2 of Fig. 1.
Figure 5:
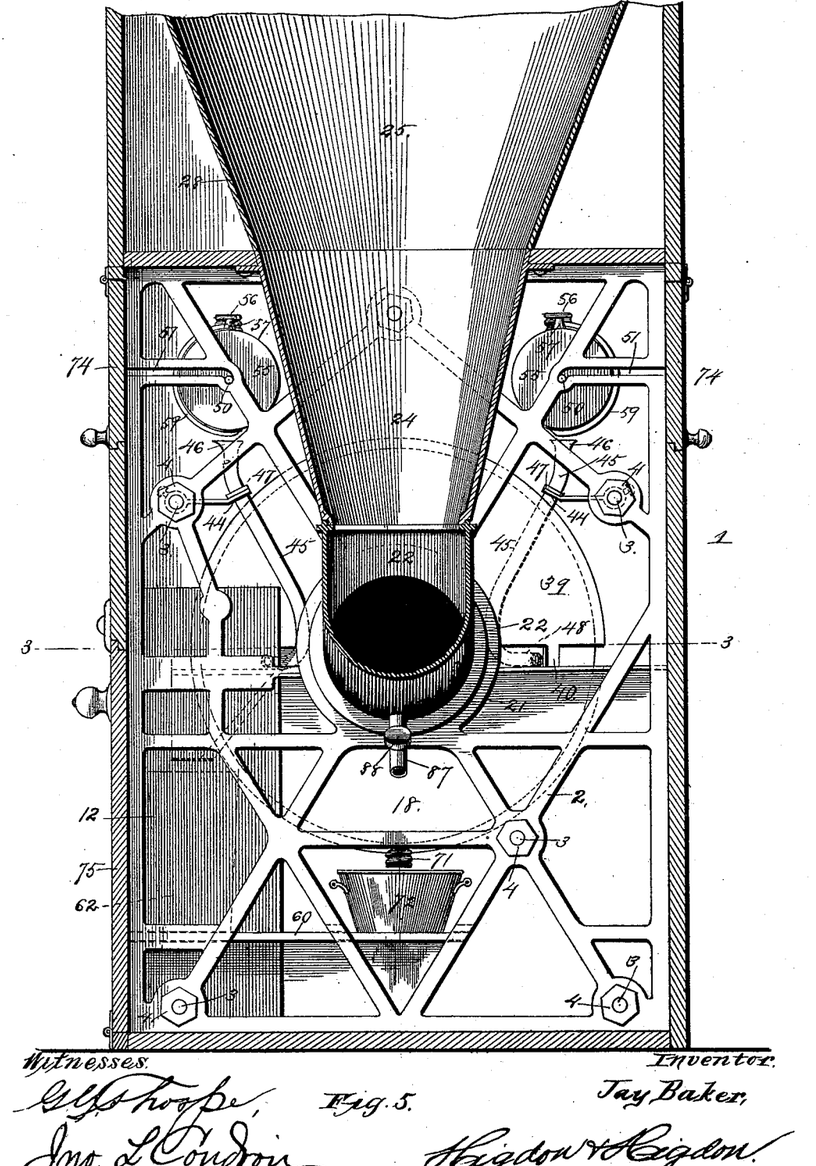
Fig. 5 is a transverse vertical section of the same on the line 5 5 of Fig. 2.
Figure 11:
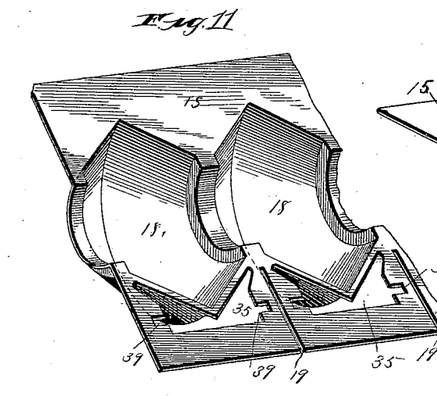
Fig. 11 is a detached perspective view of one of the pans for receiving surplus liquid preparation, and showing two of the depressions or cavities for this purpose.
Figure 12:
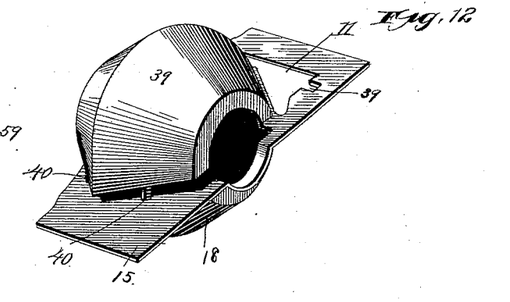
Fig. 12 is a detached perspective view of one of the inclosing cases for the freezing-receptacles.

15 designates an extended horizontal pan or partition, which is of such length as to extend horizontally from one standard 2 to the opposite standard, and the ends of which rest upon horizontal flanges or ribs 16 on the inner sides of said standards. This pan or partition is preferably of metal and extends directly beneath the couplings of the series of freezing-receptacles 5, and at points immediately beneath the said freezing-receptacles the said pan or partition is formed with a number of depressions or cavities 18, which extend transversely of the pan or partition. By reference to Fig. 11 it will be seen that each of these depressions or cavities 18 is of substantially V form, so as to correspond with the form of the adjacent part of the freezing-receptacle, and thus permit said receptacle to revolve freely above the cavity. The front portion of the pan or partition 15 is formed with a number of elongated transverse openings or slots 19, which open out of the front edge of the pan, and each of which receives the upper part of one of the supports 12, the upper parts of the supports being embraced by the openings 19 and the ribs or flanges 14 of said supports extending above and parallel with the upper side of the pan or partition. The purpose of the cavities or depressions 18 will be fully explained in the ensuing description of the general operation of the machine. The outer end of the outer coupling which occupies the end of the series opposite from the gear-wheel 11 is flanged and extended, as at 20, to rest in a bearing-frame 113, which rests against the inner side of the corresponding standard 2. This standard 2 stands at some distance from the inner surface of the corresponding end of the casing 1, and in the space 23 thus formed is located a bend or elbow 22. The lower end of this bend or elbow is inserted through an opening in the standard and abuts at its inner end against the outer end of the portion 20 of the hub 6, just described, while to the upper end of this bend or elbow is connected the lower end of a conduit 24, which extends vertically upward in the upper part of the space 23, just described. The upper end of this conduit 24 communicates with an opening in the lower part of one end of a receptacle 25 for broken ice or other cold-producing substance. This receptacle 25 is located in a compartment 26, which rests removably upon the top of the casing 1, and the walls of which are formed of wood, metal, or other similar material, which, like that of the walls of the casing 1, will perfectly retain the cold within the receptacle. As shown in Fig. 2, the bottom 27 of this receptacle is inclined downwardly toward the opening with which the upper end of the conduit 24 communicates, and, as shown in Fig. 5, the sides 28 of the receptacle are also inclined inwardly and downwardly, this arrangement of the bottom and sides of the receptacle insuring a free passage of the broken ice through the receptacle and out into the conduit 24.

In order to prevent all possibility of pieces of ice entering the receptacle 25 which would be of such size as to choke the conduit 24 or bend 22, I provide the receptacle 25 with a wire-meshing 114, the said covering lying immediately below a lid 73, to be hereinafter described. When the lid is removed, this meshing 114 is exposed, and in filling the receptacle 25 the broken ice is forced through the meshing, and the grade of such meshing is such as to prevent pieces of ice which are too large from passing through it.

Figure 3:
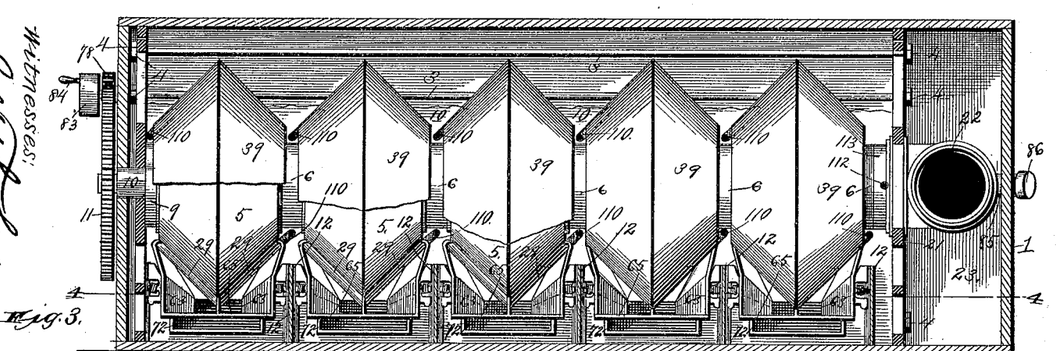
Fig. 3 is a horizontal section of the same on the line 3 3 of Fig. 5.
Figure 8:
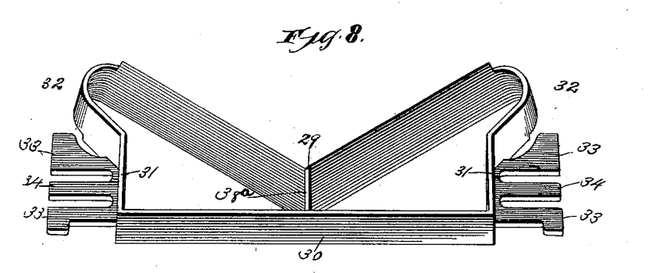
Fig. 8 is a detached perspective view of one of the knives for removing the frozen preparation from the freezing-receptacles.
Figures 14, 15, 22:
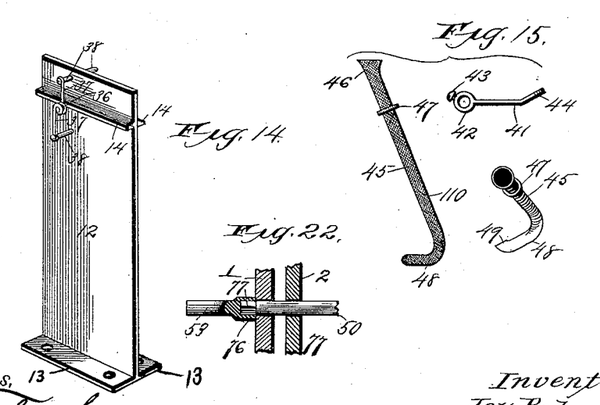
Fig. 14 is a detached perspective view of one of the supports for the surplus-receiving pans and for the knives.
Fig. 15 comprises a side elevation and a perspective view of one of the delivering-tubes and also a plan view of one of the supports for the same.
Fig. 22 is a transverse vertical section of the end portion of the feeding-receptacle shaft on the line 22 22 of Fig. 1.

29 (see also Fig. 8) designates one of the knives which are employed for removing the films of frozen preparation from the external surfaces of the revolving freezing-receptacles 5, as hereinafter more fully explained. Each of these knives 29 is of V form to correspond with the form of the outer surface of the corresponding receptacle, the outer edges of said knives lying closely adjacent to the said surface of the receptacles, as is best shown in Fig. 3. Each of these knives is carried by a frame 30, the outer portion of which is of straight elongated form, and the ends 31 of which extend at right angles to the said outer portion. The extremities of the knives are united to the extremities of the arms 31 by the outwardly-curved portions 32, and this connection is of such a nature that the knife 29 is inclined upwardly and inwardly toward the freezing-receptacle when said knife is in proper operative position in the apparatus. The middle of each knife is preferably integrally united to the middle of the cross-bar 30 by a connecting portion 30ª, which properly braces the knife. Upon the outer side of each of the arms 31 are formed two outwardly-extending arms or projections 33 and between said arms a third outwardly-extending arm or projection 34. There are as many of these knives as there are freezing-receptacles in the apparatus, and each set of arms or projections 33 34 lies immediately beneath one of the ribs 14 of the supports 12 and above that portion of the pan or partition 15 which intervenes between each of the openings 19 and an opening 35 in the said partition or pan, the said knives 29 and their frames 30 being inserted into said openings 35, which are of such form as to properly receive the same. In order to allow a slight inward and outward play or movement of each of the knives 29, each of the arms or projections 34 is surrounded by a coil 36 of a spring the arms 37 of which are attached at their extremities to pins 38, projecting transversely through the upper part of each support 12 and above and below its corresponding flange or rib 14, as best shown in Fig. 14, the said springs working also through lateral recesses 39, opening at opposite sides of the openings 35 of the partition or pan 15. As before stated, the freezing-receptacles 5 are filled or charged with cold-producing material, and in order to prevent the dissipation of this cold each of the receptacles is covered by a jacket-piece 39, which conforms to the shape of one-half of the receptacle, and which is carried by the upper side of the pan or partition 15, so as to extend above the upper side of the latter. The inner part of each of these jacket-pieces is attached to the upper side of the pan or partition 15 by two or more legs 40, so that the inner margin of the cap-pieces is separated some distance from the upper surface of the pan or partition. The opposite or outer edge of each of these jacket-pieces rests upon the arms 31 of the corresponding knives 29, so that the side edges also of the jacket-piece are separated from the upper surface of the pan or partition.

To each of the upper opposite tie-rods 3, before described, are secured a number of supports 41, (see also Fig. 15,) each of which is formed at one end with an eye 42, which embraces the tie-rod and through which passes a set-screw 43, the inner end of which impinges upon the tie-rod, and thus retains the support in proper position. The opposite end of each of these supports is also formed with an eye 44, which surrounds the upper part of one of a number of feeding-tubes 45. The said eyes 44 extend beneath rigid external collars 47 on the upper parts of said tubes. There are in the apparatus shown in Figs. 2, 3, 4, and 5 two sets of these feed-tubes 45, located at opposite sides of the longitudinal center of the casing 1 and each set extending longitudinally of the casing. The upper end 46 of each of these tubes is expanded to form a receiving-mouth, and the tube extends thence downward a certain distance toward the corresponding freezing-receptacle 5. The lower end of each of these feeding-tubes is bent laterally at about right angles, as shown at 48, and a discharge-opening 49 opens laterally from the extremity of the said portion 48. The tubes 45 at the front side of the machine incline obliquely downward and to the left, and the ends 48 extend beneath the knives 29 and into the front portions of the spaces between the left-hand edges of the jacket-pieces 39 and the upper surface of the pan or partition 10, the openings 49 of these tubes coming closely adjacent to the left-hand side of the external surface of the front parts of the freezing-receptacles and just beneath the knives 29. The opposite or rear sets of tubes 45 extend obliquely downward to the right, the portions 48 of said tubes entering the spaces between the right-hand edges of the jacket-pieces 39 and the corresponding upper surfaces of the pan or partition 15, the discharge-openings 49 being closely adjacent to the right-hand sides of the rear parts of the freezing-receptacles.

Figure 6:
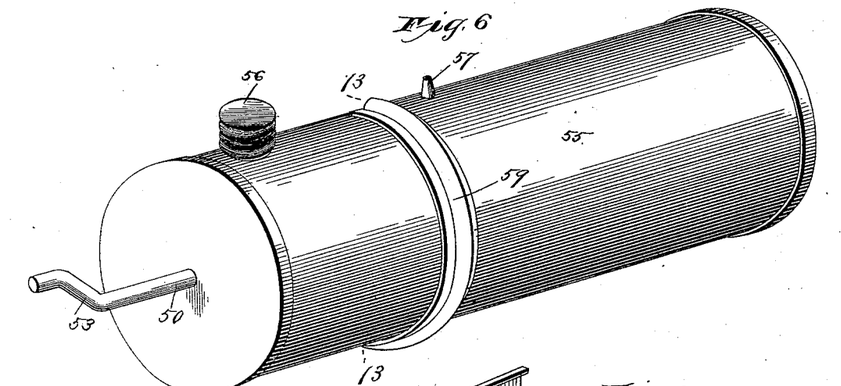
Fig. 6 is a detached perspective view of one of the receptacles for receiving and delivering the preparation to be frozen.

50 in the apparatus shown in Figs. 1, 2, 3, 4, and 5 designates two rock-shafts, which extend horizontally and longitudinally of the casing 1 at opposite sides of the center of the latter, and the ends of which rest loosely in the inner ends of horizontal slots or recesses 51, which are formed in the upper parts of the standards 2 and which open at opposite sides thereof. The left-hand end of each of these rock-shafts 50 protrudes out through the corresponding end of the casing 1, and these protruding ends of the shafts each assumes the form of a crank-arm 53, two studs or projections 54 being placed upon the outer surface of this end of the casing 1 adjacent to each crank-arm 53, so as to limit the rocking movements of the shaft, as hereinafter fully explained. Upon each of these rock-shafts are mounted a number of receptacles 55 for the liquid preparation, the number of said receptacle upon each rock-shaft 50 corresponding with the number of feeding-tubes 45 at the corresponding side of the apparatus. Each of these receptacles 55 (see also Fig. 6) is preferably of elongated cylindrical form, and is provided at one side (preferably near one end thereof) with a filling-aperture, which is closed by a suitable removable screw-cap 56 or an equivalent device, and also at the same side as—that is, in longitudinal alignment with—the cap 56 with a discharge-aperture of spout 57. At a point precisely opposite from this discharge spout or outlet 57 is formed through the side of the receptacle an opening 58, which communicates with the inner end of an external outlet-channel formed by a conduit 59. This conduit is semicircular in form, so as to extend half-way around the exterior of the receptacle transversely thereof, and is soldered, riveted, or otherwise suitably attached to the outer surface of the receptacle, it being observed that the outer terminus of the channel formed by said conduit is in longitudinal alignment with the discharge or outlet 57. When in proper operative position in the apparatus, the outlets 57 of the receptacles 55 come at times directly over the expanded upper ends or mouths 46 of the feeding-tubes 45, and the operation of these receptacles will be hereinafter fully explained.

Figure 9:
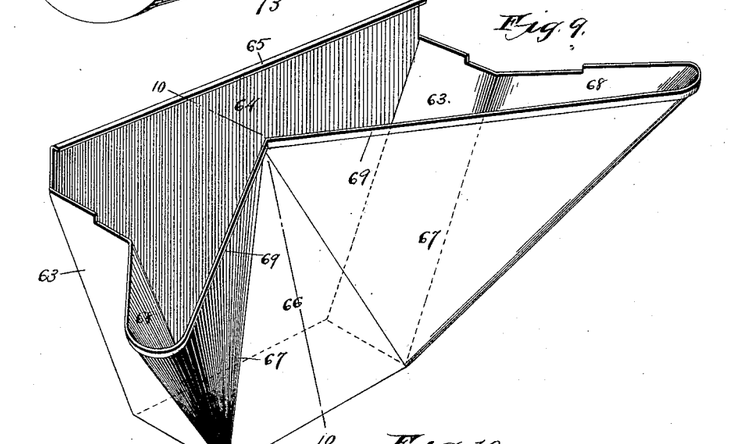
Fig. 9 is a detached perspective view of one of the devices for conducting the frozen preparation from the knives to the receivers in which the preparation is removed from the apparatus.
Figure 10:
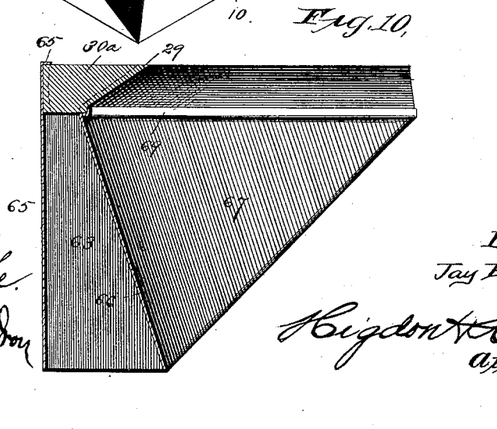
Fig. 10 is a transverse vertical section of the same on the line 10 10 of Fig. 9.

In the lower part of the front side of the apparatus is located a horizontal shelf 60, which is of such length as to extend from one standard 2 to the opposite standard, and the ends of which are supported by ribs or flanges 61 upon the inner sides of said standards. This shelf is designed to receive a number of pails, pans, or other suitable receptacles 62, which receive the frozen preparation after it has been removed from the external surfaces of the revolving freezing-receptacles, as hereinafter described, and in order to properly direct the frozen preparation from the knives 29 to these receptacles 62 each of said knives is provided with a pendent-frame 63. (See also Figs. 9 and 10.) The outer portion 64 of this frame is preferably straight, and its upper edge 65 is turned inward, so as to overlie the upper edges of the frame-piece 30. The front portion of this directing-frame is composed of a triangular middle portion 66, which inclines inwardly and downwardly, and also two triangular side portions 67, which unite either integrally or otherwise with the middle portion, and which are merged at their outer portions with two laterally and inwardly inclined portions 68 of the frame. The upper margin formed by the portions 66 and 67 is thus of V form to conform to the shape of the knife, and said margin is inwardly flanged, as at 69, to fit under said knife.

In the bottom of each cavity or depression 18, above referred to, is formed an outlet 70, which is closed by a removable screw-cap 71 or a plug, or an equivalent device, and which outlets serve to draw off any surplus preparation from the cavities or depressions after the apparatus has completed its operations, as hereinafter described. The surplus preparation so drawn off from the cavities or depressions 18 is discharged into a number of suitable pails, pans, or other receptacles 72, which are set removably upon the inner part of the shelf 60.

In order to permit the required access to the interior of the apparatus above described, the following means are employed: A removable cover or lid 73 tightly closes the top of the casing 26 of the ice-receptacle and by its removal permits the ice or other cold-producing substances to be placed in the receptacle 25 thereof, as previously described. A hinged door 75 at the lower part of one side of the casing 1 permits, when opened, access to the receptacles 62 and 72 upon the shelf 60. A hinged door 74 at each side of the upper part of the casing permits, when opened, access to the feeding-receptacles 55 and permits also the removal of the shafts 50 with their feeding-receptacles. In order to permit this removal of the shafts 50, the crank-handles 53 are each preferably formed at its inner end with an internal angular longitudinal socket 76, (see Fig. 22,) which fits a reduced and similarly angular end portion 77 of the corresponding shaft 50. By virtue of this construction the end of the casing 1 is kept practically entirely closed during the operation of the apparatus, thus retaining the cold within the apparatus, and when the feeding-receptacles 55 are to be removed it is only necessary to remove the crank-handles 53 from the shafts, (which can be done quickly,) after which the shafts 50, with their feeding-receptacles, can be readily removed.

Figure 4:
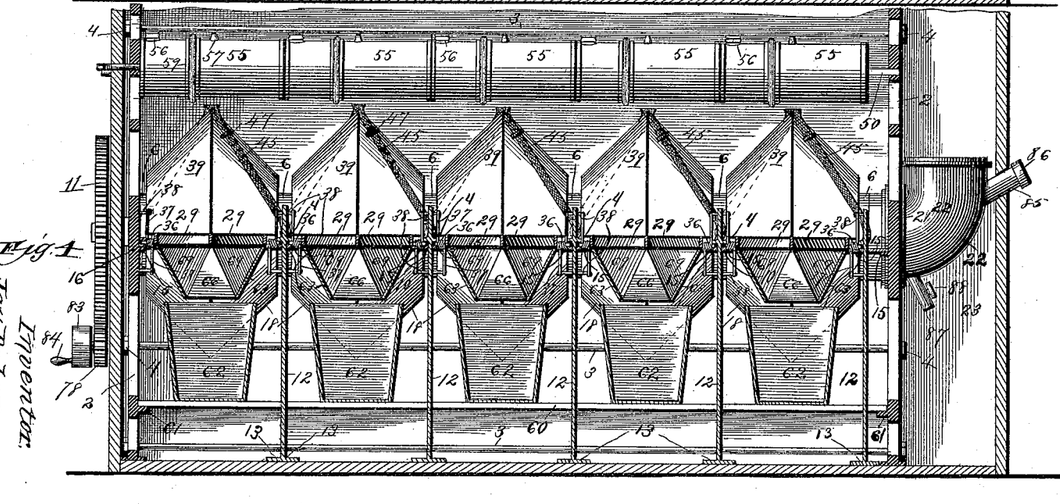
Fig. 4 is a vertical longitudinal section of the same on the line 4 4 of Fig. 3.
Figure 16:
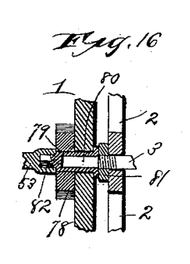
Fig. 16 is a sectional view of the actuating-pinion connections on the line 16 16 of Fig. 1.

I will now proceed to describe the gearing by means of which the required rotary movements are imparted to the freezing-receptacles. The gear-wheel 11, previously described, meshes with a gear-pinion 78, which (see Fig. 16) is mounted upon a sleeve 79 so as to turn therewith, and this sleeve passes horizontally through the corresponding end of the casing 1, and the inner portion of said sleeve surrounds the reduced cylindrical end 80 of the outer rear lower tie-rod 3, a washer 81 being screwed upon the outer part of the tie-rod and lying between the inner surface of the end of the casing 1 and the outer surface of the corresponding standard 2. The outer end 82 of this sleeve is angular and enters an angular socket in the inner end of the crank-handle 53. It will thus be seen that when the crank-handle is rotated the pinion 78 will be correspondingly rotated and will impart rotary motion to the gear-wheel 11, stud-shaft 10, and also to the series of freezing-receptacles 5. In Figs. 3 and 4 a belt-pulley 83 is shown as employed in lieu of the crank-handle 53, this being done when the apparatus is to be run by power instead of by hand. This belt-pulley is secured upon the outer end of the portion 82 of the sleeve 79, so as to turn therewith, and the operation is essentially the same as that previously explained. If desired, this belt-pulley 83 may be provided with a handle 84, so that the apparatus may be run either by hand or by power, as preferred.

It is to be observed that the bend 22 through which the broken ice passes on its way to the receptacle 25 to the freezing-receptacles 2 is preferably provided with a laterally-extending inlet 85 for salt, said inlet passing through the adjacent end of the casing 1 and having its outer end closed by a removable screw-cap 86 or a plug or an equivalent device. This bend 22 is further provided at its lower part with a drain-spout 87, having a suitable valve 88, the arrangement being such that by opening the valve 88 the water resulting from the melting of the ice can be readily drawn off.

In order to prevent the salt as it is introduced into the bend 22 through the inlet 85 from entering the drain 87 and clogging the same, I provide a long narrow plate 111, the outer end of which is secured by rivets, solder, or other suitable means to the inner surface of the lower part of the bend 22. This plate extends thence inward and its inner end rests upon the lower part of a ring 10ª, to be hereinafter described. The width of this plate is much less than that of the interior of the bend 22, so that the water can flow through a narrow space beneath the sides of the plate and enter the drain. This plate serves also to cover the outer end of the ring 10ª, and thus prevents all possibility of the ice gorging against the ring and choking the bend 22.

Figure 18:
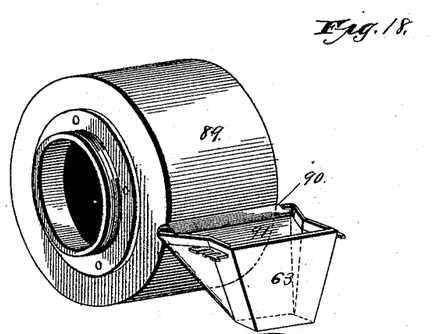
Fig. 18 is a detached perspective view of a modified form of the single freezing-receptacle.
Figure 19:
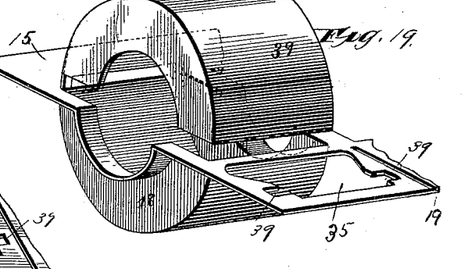
Fig. 19 is a detached perspective view of the surplus-receiving pans and of the inclosing casing for the freezing-receptacle shown in Fig. 18.

In Figs. 18 and 19 I have shown a modified form of freezing-receptacle, knife-directing frame, pan or partition, and jacket-piece. In this instance the freezing-receptacle 89 is of cylindrical form, so that its side or periphery is of straight form longitudinally. The knife 90 is in this instance perfectly straight instead of V-shaped, as is the knife 29 before described. The front 91 of the directing-frame 63 is in this instance also of straight instead of triangular form, as before. The cavity or depression 92 of the pan or partition 15 used with this form of freezing-receptacle is semi-cylindrical instead of V-formed, as is the cavity or depression 18, before described, and the jacket-piece 93, which corresponds in purpose with the jacket-piece 39, before described, is also of semi-cylindrical form.

Figure 17:
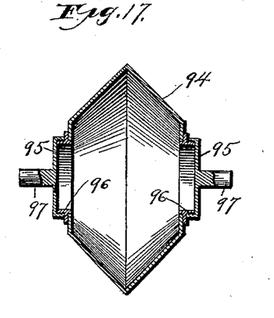
Fig. 17 is a central longitudinal section of a single form of freezing-receptacle.

In Fig. 17 I have shown a freezing-receptacle 94, which corresponds in the form of its body portion with the general form of the receptacles 5, previously described; but this receptacle is designed especially for use in small apparatus, such as would be used by families, and which employs but a single freezing-receptacle. In this instance a screw-cap 95 is screwed upon each of two couplings 96, the latter being inserted into the open ends of the freezing-receptacle, and each of said screw-caps is provided on its outer side with a stud-axle 97, which is designed to rest in the sides of the casing of the apparatus.

Figure 25:
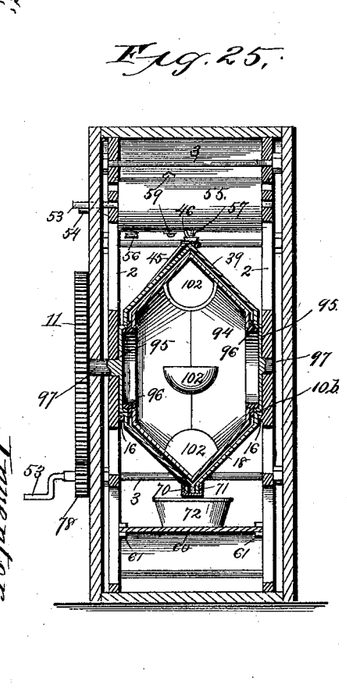
Fig. 25 is a vertical longitudinal section of an apparatus employing a single freezing-receptacle.

In Fig. 25 I have shown this freezing-receptacle mounted in its inclosing casing, a feeding-receptacle 55 being mounted in the upper part of the casing above the freezing-receptacle, and operative gearing being provided for revolving said receptacle.

The various parts of this single apparatus correspond, essentially, with the several parts above described, and are designated by similar letters of reference.

Figure 20:
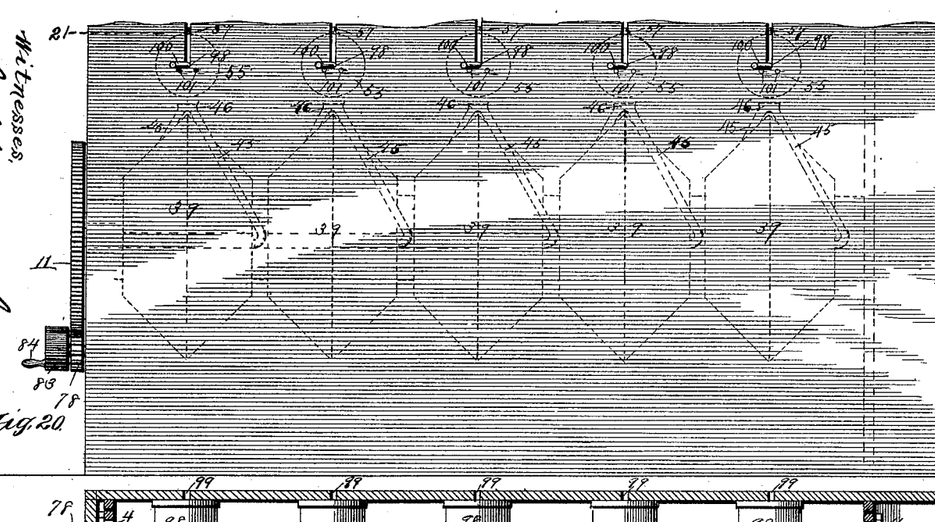
Fig. 20 is a front elevation of a modified form of the apparatus.
Figure 21:
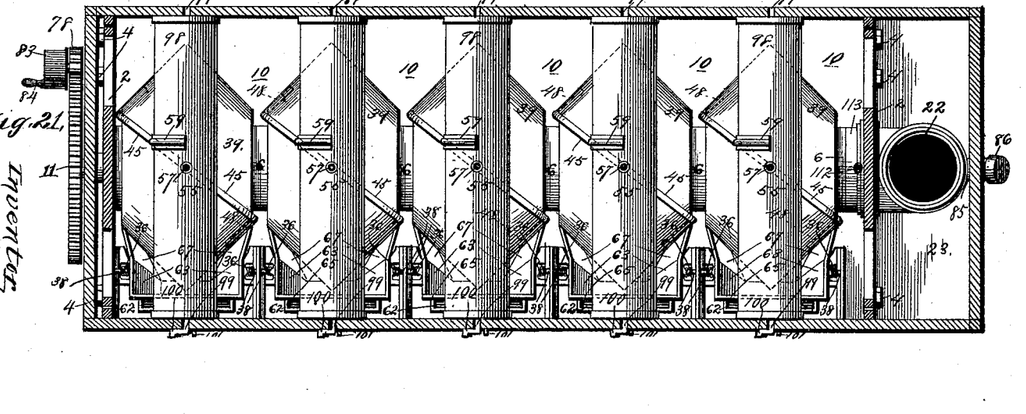
Fig. 21 is a horizontal longitudinal section of the same on the line 21 21 of Fig. 20.
Figure 24:
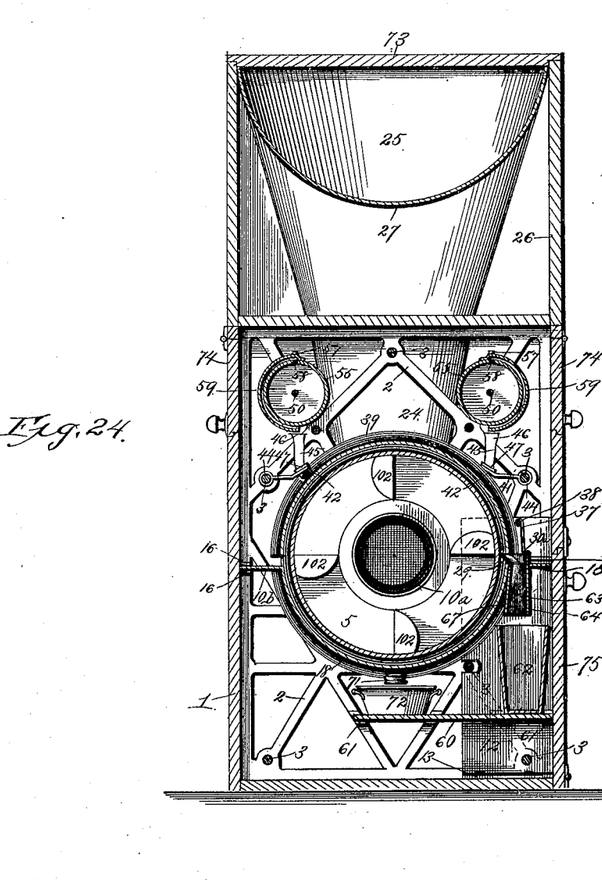
Fig. 24 is a transverse vertical section of my improved apparatus on the line 24 24 of Fig. 2.

In Figs. 20 and 21 I have shown a modified arrangement of the feeding-receptacles 55, by means of which any one of said receptacles can be brought into position to feed the liquid preparation or to stop such feed independently of the others. In this instance the receptacles themselves are constructed in all respects the same as those previously described; but each receptacle is mounted upon a separate rock-shaft 98, which extends transversely of the machine instead of longitudinally thereof, as do the rock-shafts 50, before described. The front and rear ends of these shafts rest in the lower ends of vertical slots 99 in the upper part of the front and rear walls of the casing 1, the said slots opening at their upper ends out of the upper edges of said walls so as to permit the ready insertion and removal of the rock-shafts. The front ends of these shafts carry crank-arms 100 which work in relation to stops 101 corresponding to the stops 54, heretofore described, there being two stops 101 for each crank-arm and said stops projecting from the front wall of the casing 1 and limiting the rocking movement of the shafts 98. It is to be understood that the front ends of the rocking shafts may extend into holes in the casing 1 instead of into the slots 99, and that the crank-arms 100 may be separate from the rock-shafts and connected therewith similarly, as described with reference to the rock-shafts 50 and crank-arms 53 and shown in Fig. 22.

Figure 13:
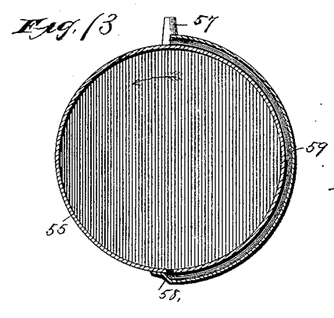
Fig. 13 is a transverse vertical section on the line 13 13 of Fig. 6 of one of the receptacles for delivering the preparation to the freezing-receptacles.

The operation of the apparatus above described is as follows: The receptacle 25 is first filled with broken ice or other cold-producing material, and this material flows downward through the conduit 24 and bend 22 and enters the series of freezing-receptacles 5, filling the same and rendering their external walls extremely cold. The feeding-receptacles 55 are now filled with the liquid preparation to be frozen, and it is to be understood that all of said receptacles 55 may either be filled with the same preparation or with different preparations, or with various preparations of different flavors, as preferred. Manual or other power is now applied to the apparatus and the freezing-receptacles are caused to revolve, as previously explained. The interiors of these receptacles are preferably provided with a number of cup-shaped pieces 102, which as the freezing-receptacles revolve stir or agitate the cold-producing material and cause it to exert its full energy upon the walls of the freezing-receptacles. As soon as the apparatus is in steady running order the feeding-receptacles 55 are turned axially, so as to bring their feeding-spouts 57 immediately over the mouths 46 of the feeding-tubes 45. The liquid preparation flows downward through the feeding-tubes 45 and is discharged against opposite sides of the freezing-receptacles at points below and opposite from the knives 29, and as the freezing-receptacles continue to revolve the liquid is spread in the form of thin films upon the external surfaces of the freezing-receptacles. The freezing-receptacles have operatively but one revolving movement—that is, they always revolve in such direction that the liquid passes first away from the under sides of the knives and then toward the upper sides of the same—and it is during these movements of the liquid that it is transformed by the cold surfaces of the freezing-receptacles into frozen films. As soon as these films reach the knives the latter quickly cut or similarly remove them from the surfaces of the freezing-receptacles, and the frozen material falls outward over the knives and downward through the directing-frames 63, and is then allowed to drop into the receptacles 62. Any frozen material which may have passed the knives, together with any drip of the liquid preparation, is received by the cavities or depressions 18, and as the apparatus continues in operation the material in the depressions or cavities is gradually caught up by the feeding-receptacles and carried to the knives, by which it is removed. Thus at the conclusion of a "run" of the apparatus but little, if any, material will be found in the depressions or cavities, and by removing the screw-caps 71 or plugs this residue can easily be drawn off into the receptacles 72 and removed from the apparatus. At the conclusion of the run the receptacles 55 are turned back so as to bring their discharge-spouts 57 uppermost, thus stopping the feed of liquid preparation, and, as before stated in the structure shown in Figs. 20 and 21, any one of these receptacles 55 can be so turned independently of the others. The opposite oscillations of either the single or numerous arrangements of these feeding-receptacles have been referred to, and I will now explain the results of such movements. Assuming the receptacles to be in their "cut-off" positions—that is, with their discharge-spouts 57 uppermost—in order to obtain a flow of the preparation out of the discharge-openings 57 it is necessary to turn the receptacles one-half of a complete revolution, so as to bring the discharge-spouts pendent, or to a point diametrically opposite from their uppermost position, and, furthermore, it is necessary that this movement shall be in the direction of the arrow shown in Fig. 13—that is to say, the receptacle must be moved so that the outer terminus of the duct 59 shall advance. If this movement be made, the level of liquid in the duct will recede therein, forming in so doing a vacuum, which draws the air through the duct, and in falling when the opening 58 has been brought uppermost, filling that part of the interior of the reservoir with sufficient air to initiate the hydrostatic balance, this balance being automatically maintained by air flowing in through the channel or duct and entering the opening 58 so long as the opening 58 is retained in its uppermost position. Thus the liquid preparation flows freely and constantly from the opening 57. When the receptacle is oscillated in the opposite direction, the flow of liquid preparation is instantly stopped at the discharge-openings 57, the air entering immediately into the receptacle through the discharge-openings, and the hydrostatic level being resumed between the interior of the receptacle and the interior of the duct or channel, as before. It will be found that the frozen product of the apparatus is extremely crisp and uniform in quality and entirely free from any trace of "grain" or icy granules. It is to be observed that as the freezing-receptacles revolve the knives remove the frozen films uniformly from the receptacles and that they preserve the uniform facing of the receptacles at all times. At the same time the knives yield sufficiently horizontally to compensate for any variations of the receptacle from the "true." In order to prevent any possibility of bearing at that end of the series of receptacles which is adjacent to the bend 22 becoming stiffened by the cold, I insert a hollow ring $10^a$ into the corresponding coupling 6 and fill said ring with oil or other liquid which resists the action of cold, and then close the ring with solder or similar material. Thus the intense cold produced by the passing refrigerating material is prevented from coming into direct contact with and stiffening this bearing. In order to properly lubricate this bearing, I provide a suitable oil-cup 112, which may be of the usual or any preferred form and the stem of which passes through the stationary bearing-frame 113, which surrounds the hub 6. The oil-cup 112 thus feeds into the space between the outer surface of the end hub 6 and the inner surface of the bearing-frame 113, and thus causes the bearing to work smoothly.

While I have described the operation of my apparatus embodying a number of freezing and feeding receptacles, it will be understood that the same principles of action are followed in small or family machines, which contain but one freezing and feeding receptacle, as shown in Fig. 25, and it is to be observed that the cylindrical form of freezing-receptacle shown in Figs. 18 and 19 may be used either singly in small machines or in series in large machines.

It is to be particularly understood that while I have shown and described three forms of the freezing-receptacles—to wit, the double frusto-conical form for use in series or singly and the cylindrical form to be used either singly or in series—I contemplate using various other forms of such receptacles, and do not wish to be regarded as confining myself exclusively to either form.

I desire it also to be particularly understood that while I have described broken ice and salt as the cold-producing substances used in the apparatus I contemplate the use of any cold-producing substances, including chemicals, it being obvious that the freezing-receptacles can be readily charged with such substances.

In order to avoid any possibility of freezing the liquid preparation during its passage through the tubes 45, I preferably coat or otherwise cover the external surfaces of said tubes with a material, as shown at 110, which will obstruct the entrance of cold.

Having thus described my invention, what I claim as new therein, and desire to secure by Letters Patent, is—

1. An improved apparatus for manufacturing ice-cream, water-ices, &c., comprising a suitable inclosing casing, a number of freezing-receptacles journaled horizontally in the lower part of said casing and having each a tubular hub, an ice-receptacle located in the upper part of the casing and having an inclined bottom and an outlet at the lower terminus of the bottom, a conduit leading downward from the outlet, and a bend or elbow communicating at its upper end with the lower end of the conduit and at its lower end with the tubular hub of one of the freezing-receptacles, substantially as set forth.

2. An improved apparatus for manufacturing ice-cream, &c., comprising a suitable inclosing casing, a number of revoluble freezing-receptacles journaled horizontally therein and having each a tubular hub, a receptacle for ice or other refrigerant, located in the upper part of the casing and having an inclined bottom and an outlet located at the lower terminus of the bottom, a conduit leading downward from the outlet, a bend or elbow communicating at its upper end with the lower end of the conduit and at its lower end with the tubular hub of one of the freezing-receptacles, and a hollow ring inclosed within said hub adjacent to its point of juncture with the bend, substantially as set forth.

3. An improved apparatus for manufacturing ice-cream, water-ices, &c., comprising a suitable receptacle for cold-producing substances, said receptacle having an inclined bottom and an outlet-opening located at the lower terminus of said bottom, a number of hollow revoluble freezing-receptacles having each a hollow hub and located below the receptacle for cold-producing substances, a conduit communicating at its upper end with the outlet-opening, a bend or elbow connected at its upper end with the lower end of the conduit and communicating at its lower end with the hub of one of the freezing-receptacles and having a drain-outlet at its lower part, and a guard-plate located in the lower part of the bend and covering the said drain-outlet, substantially as set forth.

4. An improved apparatus for manufacturing ice-cream, water-ices, &c., comprising a freezing-receptacle of double-frusto conical form, a V-shaped knife or scraper mounted adjacent to one side of the freezing-receptacle and operating by contact with the outer surface of the same, a receptacle for cold-producing substances, located above the freezing-receptacle, and a conduit leading from the receptacle for cold-producing substances to the interior of the freezing-receptacle, substantially as set forth.

5. An improved apparatus for manufacturing ice-cream, water-ices, &c., comprising a freezing-receptacle of double-frusto conical form, a spring-pressed yielding V-shaped knife or scraper mounted adjacent to one side of the freezing-receptacle and operating by contact with the outer surface of said receptacle, a receptacle for cold-producing substances, located above the freezing-receptacle, a conduit communicating with said receptacle, an oscillating feeding-receptacle located above the freezing-receptacle and having an external air-channel, and a number of feeding-tubes communicating at their lower ends with the outer surface of the freezing-receptacle and at their upper ends with the discharge-outlet of the feeding-receptacle, substantially as set forth.

6. An improved apparatus for manufacturing ice-cream, water-ices, &c., comprising a number of hollow revoluble freezing-receptacles of double-frusto conical form, a pan or partition mounted beneath said receptacles and having a number of depressions or cavities located beneath the receptacles, and outlets located in the lower parts of said cavities, oscillating feeding-receptacles mounted above the freezing-receptacles and having each an external air duct or channel, substantially as set forth.

7. An improved apparatus for manufacturing ice-cream, water-ices, &c., comprising a suitable casing, a number of hollow revoluble freezing-receptacles journaled horizontally in said casing and a number of oscillating feeding-receptacles mounted above said freezing-receptacles and having each an outlet or discharge opening formed in its side and a semicircular air duct or channel mounted upon the outer surface of the feeding-receptacle, and an opening formed through the side of the feeding-receptacle and communicating with the inner end of the said channel, the outer end of said channel terminating at a point in alignment with the discharge or outlet opening, substantially as set forth.

8. An improved apparatus for manufacturing ice-cream, water-ices, &c., comprising a number of revoluble freezing-receptacles journaled horizontally in a suitable casing, a pan or partition mounted horizontally beneath said receptacles and having a corresponding number of cavities located each immediately beneath one of the receptacles, a number of inclosing hoods extending each above one of the receptacles and each secured to the pan or partition in such manner as to leave a space between its lower edge and the upper surface of the pan or partition, a number of oscillating feeding-receptacles mounted above the freezing-receptacles and having each a discharge-outlet, and a number of feeding-spouts having each its upper end in position to coincide with one of the discharge-outlets and having its lower end inserted into the space between the corresponding hood and the upper surface of the pan or partition, substantially as set forth.

In testimony whereof I affix my signature in presence of two witnesses.

JAY BAKER.

Witnesses:
JNO. L. CONDRON,
H. E. PRICE.